United States Patent
Bruggesser et al.

(10) Patent No.: US 9,938,880 B2
(45) Date of Patent: Apr. 10, 2018

(54) HEAT EXCHANGER ASSEMBLY

(75) Inventors: Veit Bruggesser, Hildrezhausen (DE); Andreas Eilemann, Erdmannhausen (DE); Uwe Grass, Stuttgart (DE); Rolf Mueller, Steinheim/Murr (DE); Hubert Pomin, Sindelfingen (DE); Christian Saumweber, Stuttgart (DE); Juergen Stehlig, Neckartenzlingen (DE)

(73) Assignees: Mahle International GmbH (DE); Behr GmbH & Co. KG (DE)

( * ) Notice: Subject to any disclaimer, the term of this patent is extended or adjusted under 35 U.S.C. 154(b) by 352 days.

(21) Appl. No.: 14/237,164

(22) PCT Filed: Jul. 26, 2012

(86) PCT No.: PCT/EP2012/064739
§ 371 (c)(1),
(2), (4) Date: May 19, 2014

(87) PCT Pub. No.: WO2013/020826
PCT Pub. Date: Feb. 14, 2013

(65) Prior Publication Data
US 2014/0246186 A1    Sep. 4, 2014

(30) Foreign Application Priority Data

Aug. 5, 2011 (DE) .......................... 10 2011 080 474

(51) Int. Cl.
*F28F 9/02* (2006.01)
*F01P 1/06* (2006.01)
(Continued)

(52) U.S. Cl.
CPC ............ *F01P 1/06* (2013.01); *F02B 29/0462* (2013.01); *F28D 9/0031* (2013.01); *F28F 9/005* (2013.01);
(Continued)

(58) Field of Classification Search
CPC ..... F01P 1/06; F02B 29/04; F28F 9/00; F28F 9/02; F28F 1/32; F28F 3/12; F28F 3/14;
(Continued)

(56) References Cited

U.S. PATENT DOCUMENTS 1,987,116 A * 1/1935 Leach ....................... F28F 9/26
165/111
3,504,739 A * 4/1970 Pearce .................. F28D 7/1607
165/134.1
(Continued)

FOREIGN PATENT DOCUMENTS

DE         4313505 A1   10/1994
DE   102005012761 A1    9/2006
(Continued)

OTHER PUBLICATIONS

English abstract for DE102005012761.
(Continued)

*Primary Examiner* — Keith Raymond
*Assistant Examiner* — Gustavo Hincapie Serna
(74) *Attorney, Agent, or Firm* — Fishman Stewart PLLC

(57) ABSTRACT

A heat exchanger assembly may include an intercooler and a housing which encloses said intercooler. The housing may be part of a charge air line. The housing may include a charge air inlet, a charge air outlet and an opening through which the intercooler can be inserted into the housing from one side. The housing may also include a recess on the side opposite the opening, into which recess the intercooler engages. The heat exchanger assembly may include an elastic seal arranged in the region of the recess between the intercooler and the housing. The seal may be configured to at least one of bridge the deformation of the housing occurring during pressure pulsations, bridge relative movements between the intercooler and the housing, and tightly (Continued)

connect the intercooler to the housing in all operating states preventing an undesirable bypass flow.

18 Claims, 2 Drawing Sheets

(51) Int. Cl.
    *F02B 29/04*     (2006.01)
    *F28F 9/00*     (2006.01)
    *F28F 9/007*     (2006.01)
    *F28D 9/00*     (2006.01)
    *F02M 35/10*     (2006.01)

(52) U.S. Cl.
    CPC ..... *F28F 9/0075* (2013.01); *F02M 35/10236* (2013.01); *Y02T 10/146* (2013.01)

(58) Field of Classification Search
    CPC .. F28F 9/001; F28F 9/005; F28F 9/007; F28F 9/0075; F28F 9/0219; F28F 9/0239; F28F 9/0241; F28F 9/0248; F28F 9/04; F28F 9/06; F28F 9/12; G05D 16/00; F28D 1/02; F28D 1/0233; F28D 2001/026; F28D 7/06; F28D 9/0031; F02M 35/10236
    USPC ............ 165/168, 70, 71, 283, 152, 153, 176
    See application file for complete search history.

(56) References Cited

U.S. PATENT DOCUMENTS

| | | | |
|---|---|---|---|
| 4,058,980 A | | 11/1977 | Ahlen |
| 4,344,411 A | * | 8/1982 | Dearborn ................ F24B 1/183 126/34 |
| 4,436,145 A | * | 3/1984 | Manfredo ........... F02B 29/0456 123/563 |
| 4,448,243 A | * | 5/1984 | Pain ........................ F28D 7/103 165/134.1 |
| 4,635,712 A | * | 1/1987 | Baker .................... F28F 9/0229 165/70 |
| 4,735,260 A | | 4/1988 | Woehrl et al. |
| 6,000,421 A | * | 12/1999 | Huemer ............. B60H 1/00485 123/41.1 |
| 6,474,408 B1 | * | 11/2002 | Yeh ........................ F28D 9/0043 165/81 |
| 7,063,132 B2 | * | 6/2006 | Gordon ................... F24D 3/082 165/154 |
| 2003/0116305 A1 | * | 6/2003 | Beddome .............. F28D 9/0043 165/81 |
| 2003/0159807 A1 | * | 8/2003 | Ayres .................... F28D 9/0043 165/81 |
| 2005/0204730 A1 | * | 9/2005 | Tsukahara ................. F01N 3/22 60/290 |
| 2007/0175617 A1 | * | 8/2007 | Brost .................. F02B 29/0462 165/149 |
| 2008/0185133 A1 | * | 8/2008 | Mabuchi ................ B60K 13/04 165/168 |
| 2008/0185136 A1 | * | 8/2008 | Vastine ............... F02B 29/0462 165/283 |
| 2008/0245514 A1 | * | 10/2008 | Hendrix .............. F02B 29/0462 165/152 |
| 2010/0096101 A1 | * | 4/2010 | Braun ................. F02B 29/0462 165/41 |
| 2011/0056652 A1 | * | 3/2011 | Neher ................ F02M 25/0714 165/81 |
| 2012/0097136 A1 | | 4/2012 | Diem et al. |
| 2012/0210986 A1 | | 8/2012 | Ghiani |

FOREIGN PATENT DOCUMENTS

| | | |
|---|---|---|
| DE | 102007030464 A1 | 1/2009 |
| DE | 102008061759 A1 | 6/2010 |
| DE | 102010011372 A1 | 10/2010 |
| DE | 102009025292 A1 | 1/2011 |
| DE | 102009038592 A1 | 3/2011 |
| DE | 102009043264 A1 | 3/2011 |
| EP | 2014892 A1 | 1/2009 |
| FR | 2886390 A1 | 12/2006 |
| WO | WO 02/18758 * | 3/2002 |
| WO | WO-02/18758 A2 | 3/2002 |

OTHER PUBLICATIONS

English abstract for DE4313505.
English abstract for FR2886390.
European Opposition dated Jan. 24, 2017 related to corresponding European Application No. 12 741 317.7.

* cited by examiner

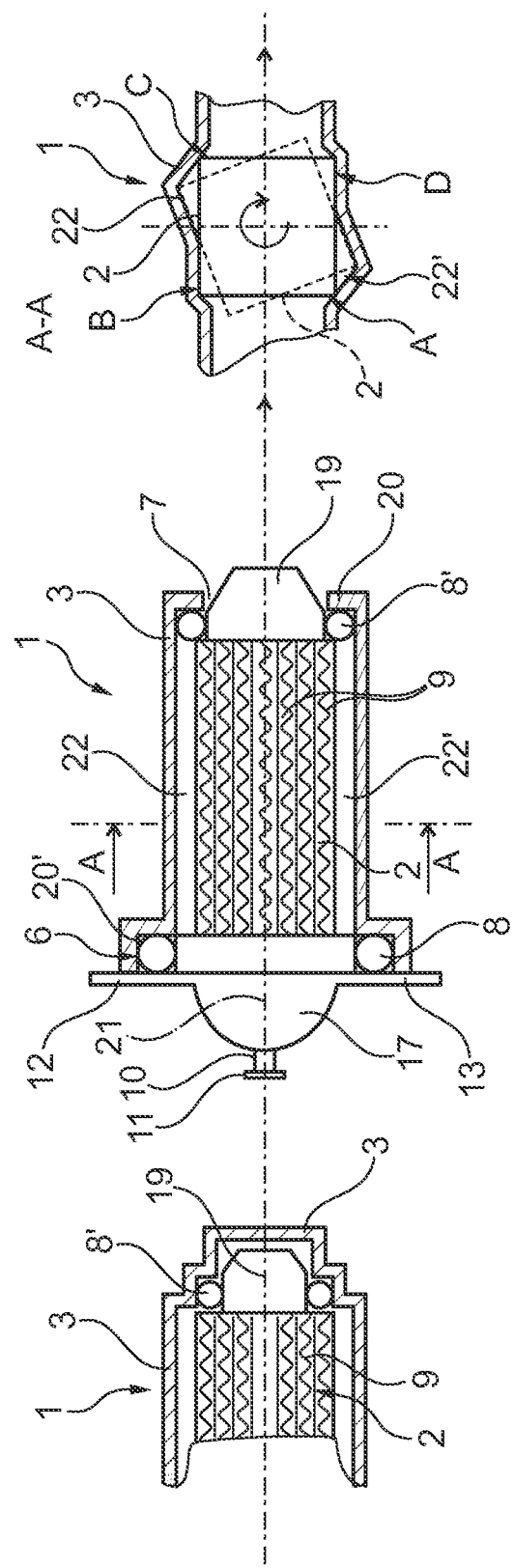

HEAT EXCHANGER ASSEMBLY

CROSS-REFERENCE TO RELATED APPLICATIONS

This application claims priority to German Patent Application Number 10 2011 080 474.9, filed Aug. 5, 2011, and International Patent Application No. PCT/EP2012/064739, filed Jul. 26, 2012, both of which are hereby incorporated by reference in their entirety.

TECHNICAL FIELD

The present invention relates to a heat exchanger assembly having an intercooler and housing which encloses said intercooler, according to the preamble of the claim 1.

BACKGROUND

From EP 2 014 892 B1, a generic heat exchanger assembly is known that has an intercooler and a housing enclosing the same, wherein the housing is part of a charge air line. Moreover, the housing has a charge air inlet, a charge air outlet and an opening through which the intercooler can be inserted into the housing from one side. On the housing side opposite said opening, the housing has a recess that receives the intercooler at least partially. The housing is preferably formed from plastic.

The disadvantage of the known prior art is that due to pressure pulsations in the charge air line, deformations of the housing can occur, which deformations are severe to such an extent that a gap is released between the intercooler and the housing, resulting in an undesirable bypass flow bypassing the intercooler. Through this, the cooling capacity of the intercooler is reduced.

SUMMARY

The present invention is therefore concerned with the problem of providing for a heat exchanger assembly an improved or at least alternative embodiment which is in particular characterized by a high cooling capacity in all operating states.

This problem is solved according to the invention by the subject matter of the independent claim 1. Advantageous embodiments are subject matter of the dependent claims.

The present invention is based on the general idea of elastically sealing an intercooler protruding into the housing, which housing is part of a charge air line or a suction tube, with respect to the housing in such a manner that the pressure pulsations occurring in the charge air line, which can result in deformations and in particular in inflation of the housing, do not release bypass paths which enable undesirable bypassing of the intercooler. In a known manner, the housing has a charge air inlet, a charge air outlet and an opening through which the intercooler is inserted from one side. On the housing side opposite said opening, a recess is provided in which the intercooler engages. According to the invention, an elastic seal is arranged in the region of the recess between the intercooler and the housing, which seal, as mentioned above, is designed in such a manner that it bridges the deformations of the housing occurring during the pressure pulsations and thus bridges the relative movements between the intercooler and the housing and tightly connects the intercooler to the housing in all operating states, and thus prevents an undesirable bypass flow and also an associated reduction of the cooling capacity. Due to the elastic sealing between the intercooler on the one hand and the housing on the other, a reliable flow through the intercooler and thus a sufficient cooling capacity is ensured that is independent of the operating state of the internal combustion engine connected to the housing and is also independent of the occurring pressure pulsations.

In an advantageous refinement of the solution according to the invention, the seal is designed as an O-ring seal, as a labyrinth seal or a sealing lip. This enumeration already indicates how versatile the seal according to the invention can be, wherein it is only of importance to seal the intercooler with respect to the housing in all operating states and thereby to avoid the undesirable bypass flow which reduces the cooling capacity.

In a further advantageous embodiment, the seal is firmly bonded to the housing, in particular adhesively bonded, vulcanized or injection molded to the housing. Such injection molding of the seal onto the housing simplifies, on the one hand, the production and manufacture of the seal according to the invention and, on the other, it ensures a secure mount of the seal at least with regard to the housing. Moreover, in the case of such a seal that is connected in a firmly bonded manner, in particular by injection molding, an additional assembly step, namely inserting a separate seal, can be eliminated so that assembly can be simplified and, accordingly, production costs can be reduced. Here, the seal can be formed from a separate material with suitable sealing properties, or can consist of the same material as the housing. Here, the seal can be manufactured as a molded seal or a sealing lip together with the housing during the production of the same.

In one configuration according to the invention, the housing has an aperture in the region of the recess. Through this aperture, the volume formed between the intercooler and the housing can communicate with the environment. This is in particular advantageous if between the seal and the housing a leaking air flow penetrates into this volume. This leaking air flow could cause that the intercooler is pressed out of the recess and a larger gap is formed, or that parts deform. This leaking air flow can escape through this opening into the environment without causing damage to the heat exchanger module, in particular to the intercooler or the housing. In a refinement of the device according to the invention, the opening is implemented such that in the region of the recess, the wall of the housing is completely cut through, and only a sealing edge for mounting the seal is provided. Thus, a part of the intercooler would form a part of the housing.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical or similar or functionally identical components.

BRIEF DESCRIPTION OF THE DRAWINGS

In the figures, schematically:

FIG. 2a shows a sectional view through another possible embodiment of the heat exchanger assembly, with the end closed, FIG. 2b shows a sectional view through another possible embodiment of the heat exchanger assembly, with the end open, FIG. 3 shows a sectional view through the sectional plane A-A.

DETAILED DESCRIPTION

Figure 1:
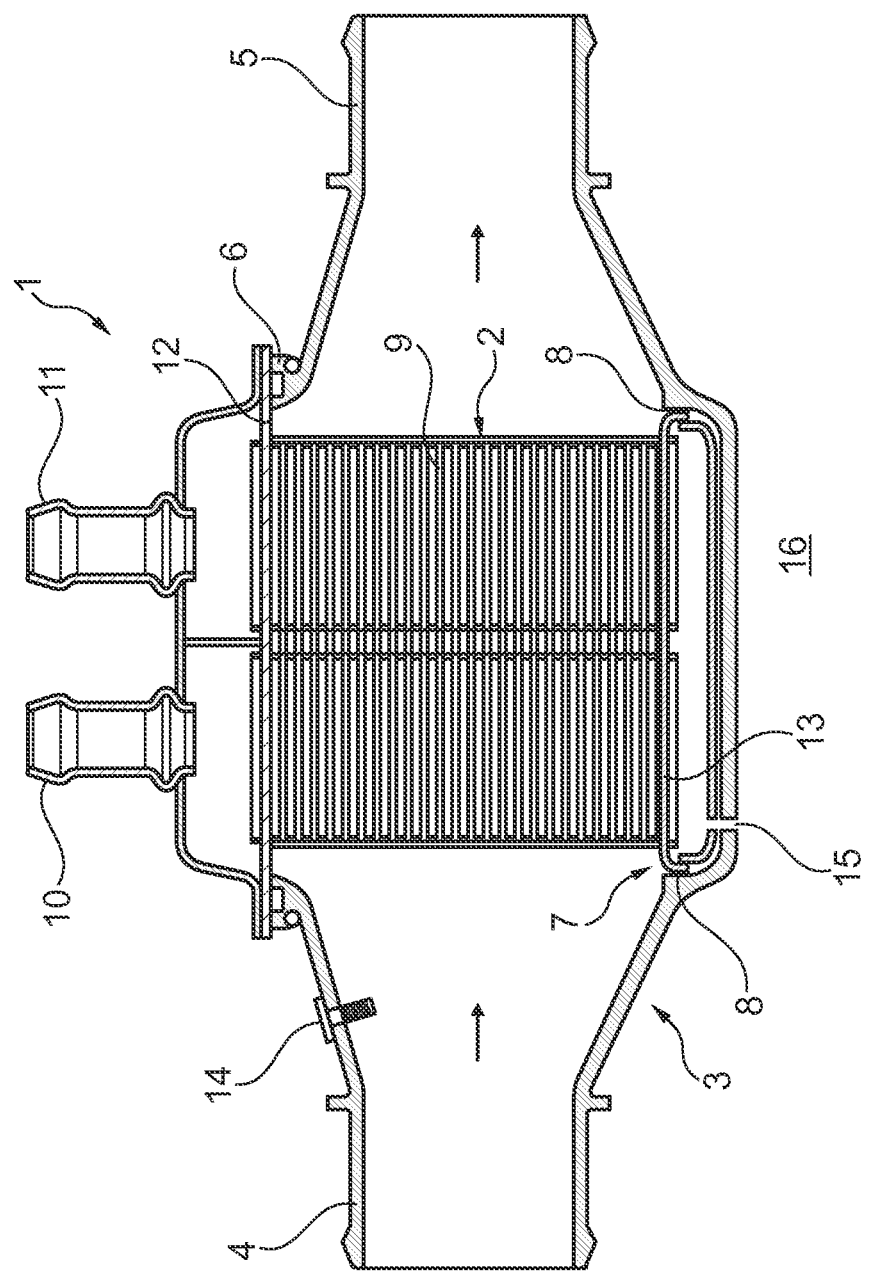
FIG. 1 shows a sectional view through a heat exchanger assembly according to the invention.

According to FIG. 1, the heat exchanger assembly 1 according to the invention has an intercooler 2 and housing 3 that encloses said intercooler and can be part of a charge air line. The housing 3 also has a charge air inlet 4, a charge air outlet 5 and an opening 6 through which the intercooler 2 can be inserted into the housing 3 from one side. Opposite the opening 6, the housing 3 has a recess 7 in which the intercooler 2 engages. During pressure pulsations taking place in the housing 3, it can occur that the housing is inflated and thereby deforms outwardly, which would cause an undesirable bypass flow in the region of the recess 7 that bypasses the intercooler 2. For this reason, an elastic seal 8 is arranged according to the invention in the region of the recess 7 between the intercooler 2 and the housing 3, which seal is designed such that it bridges the deformations of the housing 3 occurring during pressure pulsations and thus bridges the relative movements between the intercooler 2 and the housing 3 and tightly connects the intercooler 2 to the housing 3 in all operating states, and thereby prevents the undesirable bypass flow.

The seal 8 according to the invention can be designed, for example, as an O-ring seal, as a labyrinth seal or as a sealing lip, wherein this enumeration already indicates that the configuration of the seal 8 is almost freely selectable, provided that the seal is able to compensate or bridge the relative movements occurring during the operation of the heat exchanger assembly 1 between the intercooler 2 on the one hand, and the housing 3 on the other. The housing 3 is preferably formed from plastic, in particular if it is part of an intake module of an internal combustion engine. In contrast, the intercooler 2 usually is formed at least partially from metal, in particular in the region of heat transfer, thus, for example, in the region of cooling fins 9. Here, the intercooler 2 can be fluid-cooled, thus, for example, air-cooled or coolant-cooled, in particular water-cooled, and for this purpose, it can comprise a coolant inlet nozzle 10 and a coolant outlet nozzle 11.

When viewing FIG. 1, it can be seen that the intercooler 2 has a flange 12 via which the intercooler is tightly connected to the housing 3 in the region of the opening 6. However, in the region of the recess 7, the intercooler 2 has a flange plate 13 with a bent edge which rests tightly against the seal 8.

In order to simplify the production process, the seal 8, for example, can be injection molded onto the housing 3 or onto the intercooler 2, wherein in particular injection molding onto the housing 3 enables simple assembly of the intercooler 2. As is apparent from FIG. 1, the seal 8 is designed in this case as a radial seal.

In the region of the housing 3, an overpressure/low-pressure valve 14 can generally also be provided, which in particular releases overpressure to the environment upon exceeding a predefined limit value. It is also conceivable here that instead of the overpressure/low-pressure valve 14, an equalizing opening is provided which reduces peak pressures.

Due to the seal 8 provided according to the invention it is therefore possible to avoid in all operating states an bypass flow that is undesirable and reduces the cooling capacity of the intercooler 2, this means in particular also during pressure pulsations which could cause inflation of the housing 3. In addition, such a seal 8 can be produced in a comparatively cost-effective manner.

In one configuration according to the invention, the housing 3 has an aperture 15 in the region of the recess 7. Through this aperture 15, the volume formed between the intercooler 2 and the housing 3 can correspond with the environment 16. This is particularly advantageous if between the seal 8 and the housing 2, a leaking air flow penetrates into said volume. The leaking air flow could result in that the intercooler 2 is pressed out of the recess 7 and a larger gap is formed or parts deform. This leaking air can escape through the aperture 15 into the environment 16 without causing damage to the heat exchanger assembly 1, in particular to the intercooler 2 or the housing 3.

FIGS. 2a, b show another heat exchanger assembly 1 which likewise has an intercooler 2 that can be inserted into a housing 3. The flow direction of the charge air to be cooled within the housing 3 runs perpendicular to the image plane. In the present case, the intercooler 2 is inserted into the housing 3 from the left side until the seals 8, 8' seal the intercooler 2 with respect to the housing 3. The housing 3 of the heat exchanger assembly 1 is connected according to FIG. 2a in the region of a deflection tank 19, but it can also be open, as illustrated according to FIG. 2a.

The intercooler 2 is constructed as follows: On the left side, it has a coolant inlet nozzle 10 and a coolant outlet nozzle 11, which are arranged one behind the other in the drawing. Connected thereto, a first coolant tank 17 is provided via which the coolant flows into the actual intercooler 2 or the fins 9, respectively. On the right side, the deflection tank 19 is connected, which effects a deflection of the coolant flow by 180°. The region of the fins 18 is square in cross-section, whereas the intercooler 2 has a round cross-section in the region of the seals 8 and 8'. The seals 8, 8' thus can be designed as O-ring seals. A diagonal of the square fin region 9 is at a maximum as large as an outer diameter of the seal 8'. Also, a cross-sectional shape of the seals 8, 8' can be formed such that under pressure, they rest against the housing 3, in particular with sealing lips which are not shown here. Suitable as material for such seals 8, 8' are in particular two-component materials.

The installation of the intercooler 2 is carried out as follows: First, the intercooler 2 is inserted into the housing 3, namely far enough that the seal 8' abuts axially against an edge 20 of the housing 3 and the seal 8 abuts against an edge 20'. In this state, the flange 12 or the flange plate 13 rests against the housing 3. The seal 8 has a larger diameter than the seal 8'. Subsequently, the intercooler 2 is turned about its longitudinal axis 21, for example by 10-15°, as a result of which the fins 9 turn as well, and in this turned state, they occupy a previously upper space and lower space 22, 22' so that no undesirable bypass flow bypassing the fins 9 can occur here. The illustration in FIG. 2b and in FIG. 3 (dashed line) shows the intercooler 2 prior to turning.

In the sectional view in FIG. 3 it can be seen that the initially diagonally inserted intercooler 2 is turned clockwise by ca. 15-20° for final installation. In this end position, illustrated by a solid line, a bypass flow through the spaces 22, 22' is therefore no longer possible so that the charge air flow is guided exclusively through the intercooler 2. In contrast to the heat exchanger assemblies known up to now, the intercooler 2 is therefore no longer only inserted, but is subsequently turned from the installation position (diagonal) into the end position. Hereby, a bayonet catch-type plug-and-turn connection can be implemented. After reaching the end position, the flange 12 can snap in, for example.

The seals 8, 8' are appropriately designed for plastic and in addition to the sealing function, they also enable a bearing function when turning the intercooler 2 for reaching the end position. The seals 8, 8' seal in particular the critical points A, B, C and D.

For fixing the intercooler 2 in the housing 3, advantageously, a clip lock or a bayonet catch can be provided. In particular the latter significantly facilitates assembly and disassembly of the intercooler 2 and secures the same at the same time in the installed state. Of course, screwing or welding the intercooler 2 to the housing 3 is also conceivable. With the design according to the invention of the intercooler 2, in particular the forces acting on the intercooler 2, in particular flange forces, are reduced since by means of the two seals 8, 8', floating mounting can be achieved. The seals 8, 8' act in the radial direction and also in the axial direction.

The intercooler 2 is preferably made from light metal, in particular from aluminum.

The invention claimed is:

1. A heat exchanger assembly, comprising:
   an intercooler;
   a housing enclosing the intercooler, the housing being part of a charge air line, the housing including a charge air inlet, a charge air outlet and an opening through which the intercooler can be inserted into the housing from one side, wherein the intercooler is arranged in an air flow path between the charge air inlet and the charge air outlet;
   the housing further including a wall defining a recess disposed on the side opposite to the opening, and the intercooler is arranged engaging into the recess;
   an elastic seal disposed in the region of the recess between the intercooler and the housing to facilitate preventing a bypass flow in the region of the recess, wherein the seal is configured to at least one of bridge the deformation of the housing occurring during pressure pulsations, bridge relative movements between the intercooler and the housing, and sealingly connect the intercooler to the housing in all operating states;
   wherein an enclosed space defining a volume sealed off from the air flow path is disposed in the region of the recess between the intercooler and the housing, the enclosed space defined by a bottom of the intercooler and the wall of the housing defining the recess, wherein the seal fluidly seals the volume of the enclosed space from the air flow path;
   an aperture disposed in the wall of the housing defining the recess, wherein the volume of the enclosed space is in fluid communication with an external environment via the aperture such that a leaking air flow penetrating the enclosed space into the volume is communicated to the external environment; and
   wherein the seal is an injection molded material fixedly bonded to the housing and engaged against by the intercooler such that the seal securely connects the intercooler to the housing.

2. The heat exchanger assembly according to claim 1, wherein the seal is at least one of an O-ring seal, a labyrinth seal, and a sealing lip.

3. The heat exchanger assembly according to claim 1, wherein the housing is composed of plastic.

4. The heat exchanger assembly according to claim 1, wherein the intercooler is at least one of air-cooled and coolant-cooled.

5. The heat exchanger assembly according to claim 1, wherein the intercooler has a flange connecting the intercooler to the housing in the region of the opening.

6. The heat exchanger assembly according to claim 1, wherein the housing is part of an intake module of an internal combustion engine.

7. The heat exchanger assembly according to claim 1, wherein the seal is a radial seal.

8. The heat exchanger assembly according to claim 1, further comprising a flange plate disposed at the bottom of the intercooler in the region of the recess, the flange plate provided with a bent edge engaging against the seal to facilitate preventing the bypass flow.

9. The heat exchanger assembly according to claim 4, wherein the coolant is water.

10. The heat exchanger assembly according to claim 1, wherein the intercooler contains a heat transfer region including a plurality of heat transfer elements, the intercooler further including a coolant inlet nozzle and a coolant outlet nozzle for a coolant, and wherein the heat transfer region of the intercooler is arranged in a coolant flow path between the coolant inlet nozzle and the coolant outlet nozzle.

11. The heat exchanger assembly according to claim 10, wherein the intercooler has a flange plate disposed at the bottom of the intercooler in the region of the recess, the flange plate having a bent edge resting against the seal, wherein the seal is disposed between the bent edge of the flange plate and the wall of the housing defining the recess.

12. The heat exchanger assembly according to claim 10, wherein the plurality of heat transfer elements includes cooling fins.

13. The heat exchanger assembly according to claim 1, further comprising a pressure release valve coupled to the housing configured to open in response to a pressure exceeding a predefined threshold.

14. An intake module of an internal combustion engine, comprising:
   a housing and an intercooler arranged in the housing;
   the housing including a charge air inlet, a charge air outlet and an opening via which the intercooler is insertable into the housing, wherein the intercooler is arranged in an air flow path between the charge air inlet and the charge air outlet;
   the housing further including a wall defining a recess on a side opposite the opening, wherein the intercooler engages into the recess and provides an enclosed space in a region of the recess having a volume sealed off from the air flow path, and wherein the enclosed space is defined by a bottom of the intercooler and the wall of the housing defining the recess;
   an elastic seal arranged in the region of the recess between the intercooler and the housing, wherein the seal is configured to at least one of compensate for a deformation of the housing during a pressure pulsation, compensate for relative movements between the intercooler and the housing, and sealingly connect the intercooler to the housing to facilitate preventing a bypass air flow;
   a flange plate disposed at the bottom of the intercooler in the region of the recess, the flange plate having a bent edge engaging against the seal such that the seal is disposed between the bent edge of the flange plate and the housing;

an aperture disposed in the wall of the housing defining the recess, wherein the volume of the enclosed space communicates with an external environment via the aperture to discharge a leaking air flow penetrating into the volume from the air flow path; and wherein the seal is an injection molded material fixedly bonded to the housing and engaged against by the bent edge of the flange plate such that the intercooler is securely connected to the housing.

15. The intake module according to claim 14, wherein the housing is part of a charge air line.

16. The intake module according to claim 14, further comprising a pressure release valve coupled to the housing configured to open in response to a pressure exceeding a predefined threshold.

17. The intake module according to claim 14, wherein the flange plate extends along the intercooler in the region of the recess between the bent edge engaging against the seal.

18. The heat exchanger assembly according to claim 8, wherein the flange plate extends along the intercooler in the region of the recess between the bent edge engaging against the seal.

* * * * *